J. D. FILKINS.
Bog-Cutter.
No. 6,018. Patented Jan. 9, 1849.
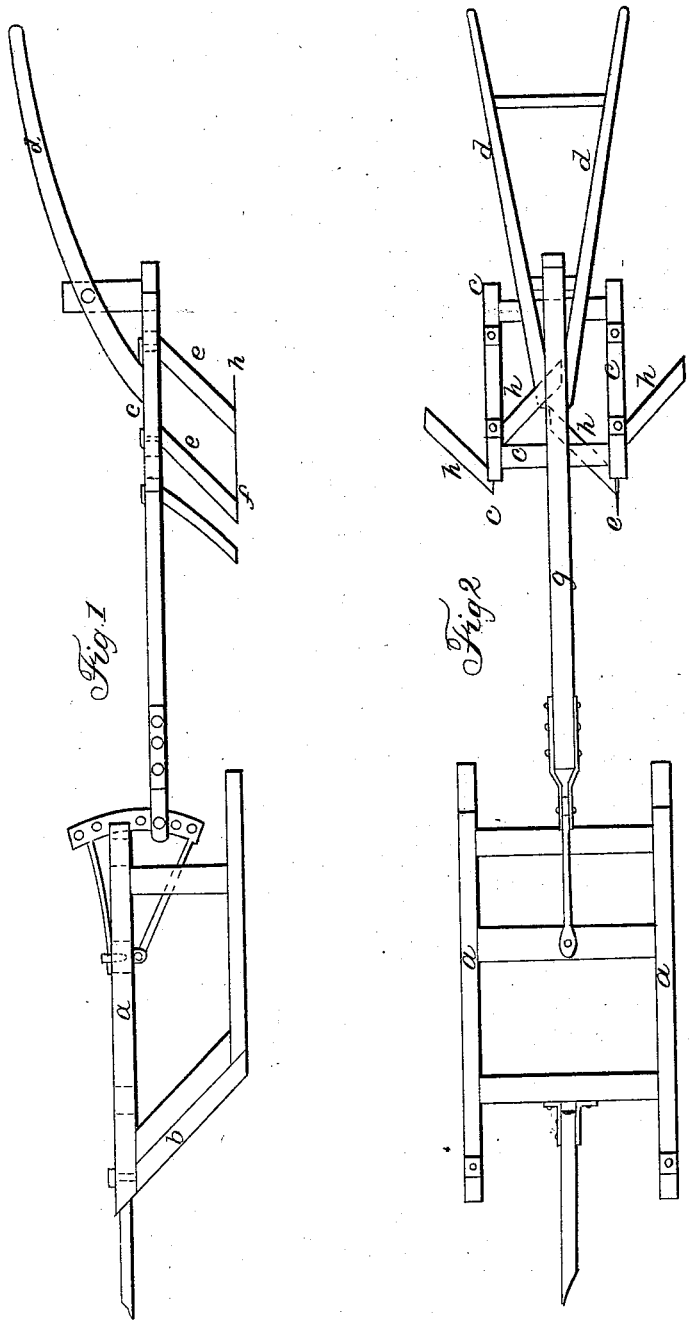

UNITED STATES PATENT OFFICE.

JNO. D. FILKINS, OF LIMA, INDIANA.

IMPROVEMENT IN BOG-CUTTERS.

Specification forming part of Letters Patent No. 6,018, dated January 9, 1849.

*To all whom it may concern:*

Be it known that I, JOHN D. FILKINS, of Lima, La Grange county, in the State of Indiana, have invented a new and useful machine for cutting away what are termed "bogs" from the surface of marshy ground, so as to render the ground fit to be prepared for sowing any kind of seed; and I do hereby declare that the following is a full, clear, and exact description of its nature and construction, reference being had to the accompanying drawings, making part of this specification, in which—

Figure 1 is a side elevation, and Fig. 2 a top plan.

The same letters indicate like parts in both figures.

The nature of my invention consists in so arranging in a proper frame-work a set of horizontal steel knives, which are drawn along the surface of the ground and cut or shave off what are termed "bogs" from marshy places, thus leaving a clear surface; and also attaching the middle beam of the aforesaid frame to the rear end of a sled, the front or inclined parts of the runners being provided with steel knives, so that as the machine is drawn along by the team, when the runners come in contact with a bog the knives will split it, and yet keep the machine level and steady.

The construction is as follows, viz: A represents a common sled, the front or inclined parts of the runners being provided with steel knives $b$ to split the bogs. To the front part of the sled is attached in any convenient manner the team. To the rear end of the sled the middle beam of the frame $c$ is attached. This beam extends back some distance, and to it are attached two handles, $d$, by which the machine is guided. To each of the outer pieces of the frame-work $c$ are bolted two sets of knives, $e$. These knives project down to the ground, and at the same time they incline forward at an angle of about forty-five degrees to facilitate the cutting operation. These knives are connected together on each side of the frame at the bottom by a flat piece of steel or iron, $f$, and to each of these flat pieces are connected two or more horizontal knives, $h$. These knives also rest on the surface of the ground and incline backward at an angle of about forty-five degrees, as is clearly shown in Fig. 2, so that as the machine is drawn along they will cut the bogs with ease.

Having thus fully described my invention, what I claim therein as new, and desire to secure by Letters Patent, is—

1. Providing the front or inclined part of the runners of the sled with steel knives $b$, for the purpose herein specified.

2. The combination of the sled $a$ with the frame-work, to which the horizontal knives are attached.

3. The combination of the double horizontal knives $h$ $h$, resting on the surface of the ground and inclining backward at an angle of about forty-five degrees, with the pole $g$, for the purpose and in the manner herein specified and fully made known.

JOHN D. FILKINS.

Witnesses:
EDMUND BROWN,
WM. H. DE PUY.